(12) United States Patent
Nishimura et al.

(10) Patent No.: US 9,999,945 B2
(45) Date of Patent: Jun. 19, 2018

(54) SOLDER ALLOY (75) Inventors: Tetsuro Nishimura, Suita (JP); Kazuhiro Nogita, Brisbane (AU); Stuart David McDonald, Brisbane (AU); Jonathan James Read, Brisbane (AU); Tina Ventura, Zofingen (CH)

(73) Assignees: NIHON SUPERIOR CO., LTD., Osaka (JP); THE UNIVERSITY OF QUEENSLAND, Brisbane (AU)

( * ) Notice: Subject to any disclaimer, the term of this patent is extended or adjusted under 35 U.S.C. 154(b) by 211 days.

(21) Appl. No.: 14/110,458

(22) PCT Filed: Apr. 6, 2012

(86) PCT No.: PCT/JP2012/059465
§ 371 (c)(1),
(2), (4) Date: Oct. 8, 2013

(87) PCT Pub. No.: WO2012/137901
PCT Pub. Date: Oct. 11, 2012

(65) Prior Publication Data
US 2014/0030140 A1 Jan. 30, 2014

(30) Foreign Application Priority Data
Apr. 8, 2011 (JP) .................................. 2011-086183

(51) Int. Cl.
*B23K 35/26* (2006.01)
*C22C 13/00* (2006.01)
(52) U.S. Cl.
CPC ............ *B23K 35/262* (2013.01); *C22C 13/00* (2013.01)

(58) Field of Classification Search
CPC ...... B23K 35/262; B23K 35/26; B23K 35/24; B23K 35/22; C23C 13/00
USPC .......................................................... 420/560
See application file for complete search history.

(56) References Cited

U.S. PATENT DOCUMENTS 6,180,055 B1 * 1/2001 Tetsuro ................ B23K 35/262
420/560

FOREIGN PATENT DOCUMENTS

| CN | 1775456 A | * | 5/2006 | |
|---|---|---|---|---|
| CN | 1974110 A | * | 6/2007 | |
| JP | 2003-211283 | | 7/2003 | |
| JP | 2005-125360 | | 5/2005 | |
| JP | 2005-238328 | | 9/2005 | |
| JP | 2005-296983 | | 10/2005 | |
| JP | 2005-319470 | | 11/2005 | |
| JP | 2007-190603 | | 8/2007 | |
| JP | 2008-030047 | | 2/2008 | |
| WO | 99/48639 | | 9/1999 | |
| WO | WO 2007014530 A1 | * | 2/2007 | ............. C22C 13/00 |

(Continued)

OTHER PUBLICATIONS

International Preliminary Report on Patentability, PCT/JP2012/059465 (dated Oct. 17, 2013).

(Continued)

*Primary Examiner* — Colleen P Dunn
*Assistant Examiner* — Anthony M Liang
(74) *Attorney, Agent, or Firm* — Thompson Hine LLP (57) ABSTRACT

A solder alloy may include a Sn—Cu hypereutectic area having Cu in the amount of up to 7.6 weight percent, from 0.006 to 0.5 weight percent of Al, $Al_2O_3$, or a combination thereof.

7 Claims, 5 Drawing Sheets

(56) References Cited

FOREIGN PATENT DOCUMENTS

WO     WO 2009009877 A1 *   1/2009   ............. B23K 35/22

OTHER PUBLICATIONS

International Search Report, PCT/JP2012/059465 (dated Jul. 17, 2012).

* cited by examiner

[Fig. 1]

| ALLOY | SEM PHOTOGRAPH OF CROSS-SECTION (×300) | SEM PHOTOGRAPH OF CROSS-SECTION (×1000) |
|---|---|---|
| Sn-4Cu |  |  |
| Sn-4Cu-0.006Al |  |  |
| Sn-4Cu-0.02Al |  |  |
| Sn-4Cu-0.08Al |  |  |

[Fig. 2]

| ALLOY | SEM PHOTOGRAPH OF CROSS-SECTION (×300) | SEM PHOTOGRAPH OF CROSS-SECTION (×1000) |
|---|---|---|
| SN100C4 |  |  |
| SN100C4 -0.006Al |  |  |
| SN100C4 -0.04Al |  |  |
| SN100C4 -0.1Al |  |  |

[Fig. 3]

| ALLOY | SEM PHOTOGRAPH OF CROSS-SECTION (×300) | SEM PHOTOGRAPH OF CORSS-SECTION (×1000) |
|---|---|---|
| Sn-2Cu |  |  |
| Sn-2Cu -0.05Al |  |  |

[Fig. 4]

| ALLOY | SEM PHOTOGRAPH OF CROSS-SECTION (×300) | SEM PHOTOGRAPH OF CROSS-SECTION (×1000) |
|---|---|---|
| Sn-7.6Cu | | |
| Sn-7.5Cu -0.051Al | | |
| Sn-7.3Cu -0.143Al | | |
| Sn-6.9Cu -0.373Al | | |

[Fig.5]

SOLDER ALLOY

TECHNICAL FIELD

The present invention relates to the solder composition of a tin-copper based solder alloy that features increased tensile strength and increased solder joint crack resistance.

BACKGROUND ART

Since lead is harmful to human bodies, a lead-free solder alloy is going to be in widespread use. Sn is widely used as a basic composition because of the low melting point thereof and the relatively low production costs thereof Solder alloys that have been developed in view of this includes a tin-copper based solder alloy of eutectic Sn—Cu solder with Cu containing of about 0.7 weight percent added thereto, and a solder alloy resulting from adding Ag to the copper based solder alloy to ensure further intensity.

Technical advance improves electronic circuit architecture techniques of ICs and the like, and permits electronic devices to be downsized. Lead line spacing pitch of ICs becomes extremely narrow, and miniature design is required of a solder joint accordingly. For example, solder balls currently in widespread use have typically a diameter of 20 microns.

CITATION LIST

Patent Literature

PTL 1: WO99/48639
PTL 2: Japanese Unexamined Patent Application Publication No. 2005-238328
PTL 3: Japanese Unexamined Patent Application Publication No. 2005-319470

SUMMARY OF INVENTION

Technical Problem

It is known that a $Cu_6Sn_5$ intermetallic compound is created between a solder alloy containing Sn as a basic metal and a Cu substrate. When a solder joint is formed, the abundance of this kind of intermetallic compound in a phase boundary becomes a cause to lower the joint strength of the solder joint. To avoid lowering of the joint strength, a technique has been developed to control the creation of $Cu_6Sn_5$ on the phase boundary by adding a trace amount of Ni (PTL 1). As with this composition, the alloy of Sn—Cu adding Ni thereto increases fluidity in the molten state thereof, and is thus appropriate for wave soldering.

However, if $Cu_6Sn_5$ crystallizes out as a primary crystal in a hypereutectic area containing an Sn—Cu solder alloy (0.7 to 7.6 weight percent of Cu), a step needs to be performed to control the growth of the $Cu_6Sn_5$ intermetallic compound. For example, since BGA solder balls are extremely small in size, the $Cu_6Sn_5$ intermetallic compound can grow as a primary crystal across a BGA diameter. If such BGA is used as a solder joint, there is a possibility that a crack can run in the solder alloy along the $Cu_6Sn_5$ intermetallic compound crystallized as a primary crystal if a shock is applied. A large growth of the intermetallic compound adversely affects the downsizing of the electronic circuit. It is known that the addition of Ni stabilizes the crystal structure of the $Cu_6Sn_5$ intermetallic compound as a hexagonal crystalline structure created between the solder alloy and the Cu substrate and increases the joint strength of the phase boundary. But there is no finding about the effect of the addition of Ni in miniaturization the $Cu_6Sn_5$ intermetallic compound crystallized as a primary crystal in the solder alloy and in controlling the growth of the $Cu_6Sn_5$ intermetallic compound.

As previously described, PTL 1 as related art discloses a technique in which the creation of an eutectic $Cu_6Sn_5$ intermetallic compound is controlled by adding Ni. In the invention disclosed in PTL 1, the presence of Ni in Sn—Cu is thus essential.

In accordance with PTL 2, a compound of a coarse primary crystal β-Sn phase in a hypoeutectic composition with Sn being a body material is miniaturized, and hardness of the phase is increased to almost the same level as an eutectic phase. To achieve this, a trace amount of Al is added. In accordance with PTL 3, particles containing an element substantially not dissolving are added to a lead-free eutectic Sn—Cu—Ag based solder, and the metal composition of a joint portion of the solder is miniaturized. Al is selectively used as the element.

In accordance with PTL 2 and PTL 3, a trace amount of Al is contained. However, the technique disclosed in PTL 2 is intended to increase the hardness of the hypoeutectic composition in the primary crystal β-Sn phase. The technique disclosed in PTL 3 is intended to miniaturize the eutectic composition of the solder joint by adding Al. These PTLs do not pay attention to the fact that the primary crystal $Cu_6Sn_5$ intermetallic compound inevitably created in a hypereutectic Sn—Cu alloy tends to grow relatively larger in a tree-like fashion.

The present invention addresses the problem that the primary crystal $Cu_6Sn_5$ intermetallic compound of the hypereutectic Sn—Cu alloy adversely affects physicality of the solder joint. In particular, the object of the present invention is to disclose an alloy composition that effectively controls the cracking of the solder joint.

Solution to Problem

To solve the above problem, the present invention in the first aspect thereof provides a solder alloy that contains Cu higher than 0.7 weight percent, which is the eutectic point of tin and copper, to 7.6 weight percent, and 0.006 to 0.15 weight percent of Al with the remainder being Sn. The present invention further provides an Sn—Cu—Ni—Al solder alloy that contains the solder alloy in the first aspect with 0.03 to 0.1 weight percent of Ni partially substituted for the remainder Sn. The present invention further provides an Sn—Cu—Ag—Al solder alloy that contains the solder alloy in the first aspect with 0.1 to 3.5 weight percent of Ag partially substituted for the remainder Sn. $Al_2O_3$ is selectively added to the solder alloy in place of Al.

More preferably, the lower limit value of the additive amount of Cu is 2.0 weight percent or higher.

Al is a light metal having the melting point of 660.2 degrees C., and a density of 2.7 g/cm³, and is easily oxidized to $Al_2O_3$. The additive components in the present invention may include one of Al and $Al_2O_3$. The additive components in the present invention may further include Al alone, or $Al_2O_3$ alone, or a combination thereof.

Figure 1:
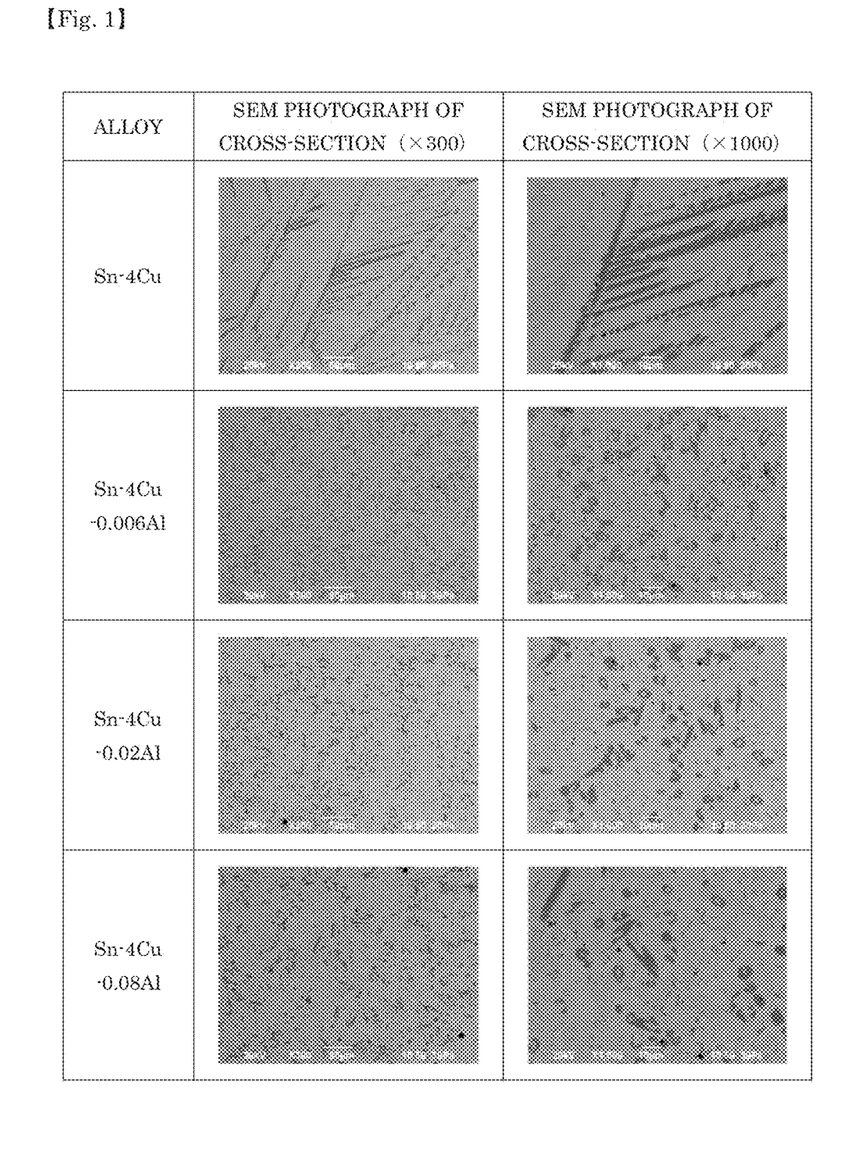
FIG. 1 illustrates the SEM photographs of the cross-section of the Sn—Cu alloy with a trace amount of Al added thereto.

The growth of the primary crystal $Cu_6Sn_5$ intermetallic compound in response to the addition of Al was examined. To this end, a sample containing Sn-4 wt % Cu with Al addition was produced. FIG. 1 illustrates SEM photographs illustrating a cross-section of a solidified body of the sample. The inventors of this invention produced four types of samples different in the additive amount of Al, and checked photographs magnified by 300 times and 1000 times. The additive amounts of Al are 0 ppm, 60 ppm, 200 ppm, and 800 ppm from the top of the photograph of FIG. 1. The fact clearly shows that the primary crystal $Cu_6Sn_5$ intermetallic compound is crystallized in an elongated shape and in a tree-like fashion at a slant angle in the sample with no Al addition. On the other hand, the primary crystal $Cu_6Sn_5$ intermetallic compound does not grow and are shaped in particles in the samples with Al addition. This phenomenon is slightly different depending on the additive amount of Al, but the inventors confirmed that the primary crystal $Cu_6Sn_5$ intermetallic compound was shaped in particles in the three samples. The inventors have not yet reached a definite conclusion about a mechanism that controls the growth of the primary crystal $Cu_6Sn_5$ intermetallic compound with Al addition. However, it is estimated that the frequency of forming a nucleus of the primary crystal $Cu_6Sn_5$ intermetallic compound is increased because each of dispersed Al miniature particles serves as the nucleus so that the growth speed of the primary crystal $Cu_6Sn_5$ intermetallic compound is reduced. The addition of Al is not a factor that reduces the total amount of the $Cu_6Sn_5$ intermetallic compound, but a factor that prevents the $Cu_6Sn_5$ intermetallic compound from growing in the tree-like fashion. The additive amounts of Al in the samples of FIG. 1 are actual measurement values. Al is lower in density than Sn, and some Al is uniformly dispersed, and other Al is floating on the surface of a molten metal. In the present invention, the additive amount of Al in the solidified body was measured to accurately identify the additive amount of Al that works effectively.

If the primary crystal $Cu_6Sn_5$ intermetallic compound crystallizes in a large deposit, an uneven portion develops in the deposit in a solder solidified body. If the portion in such a state is present in a solder joint, a crack can be caused in response to an impact shock. In particular, a solder joint is formed of an extremely miniature BGA today, and it is likely that the primary crystal $Cu_6Sn_5$ intermetallic compound extends along the entire length of the solder joint in the state with no Al addition as illustrated in FIG. 1. More specifically, under such a condition, the solder joint is not only partially cracked, but also cracked throughout the length thereof. This causes substrates, joined to each other by BGA, to peel off from each other. On the other hand, since a uniform Sn—Cu phase continues in the three samples with Al addition thereto, the development of the crack caused by the $Cu_6Sn_5$ intermetallic compound is avoided.

Figure 2:
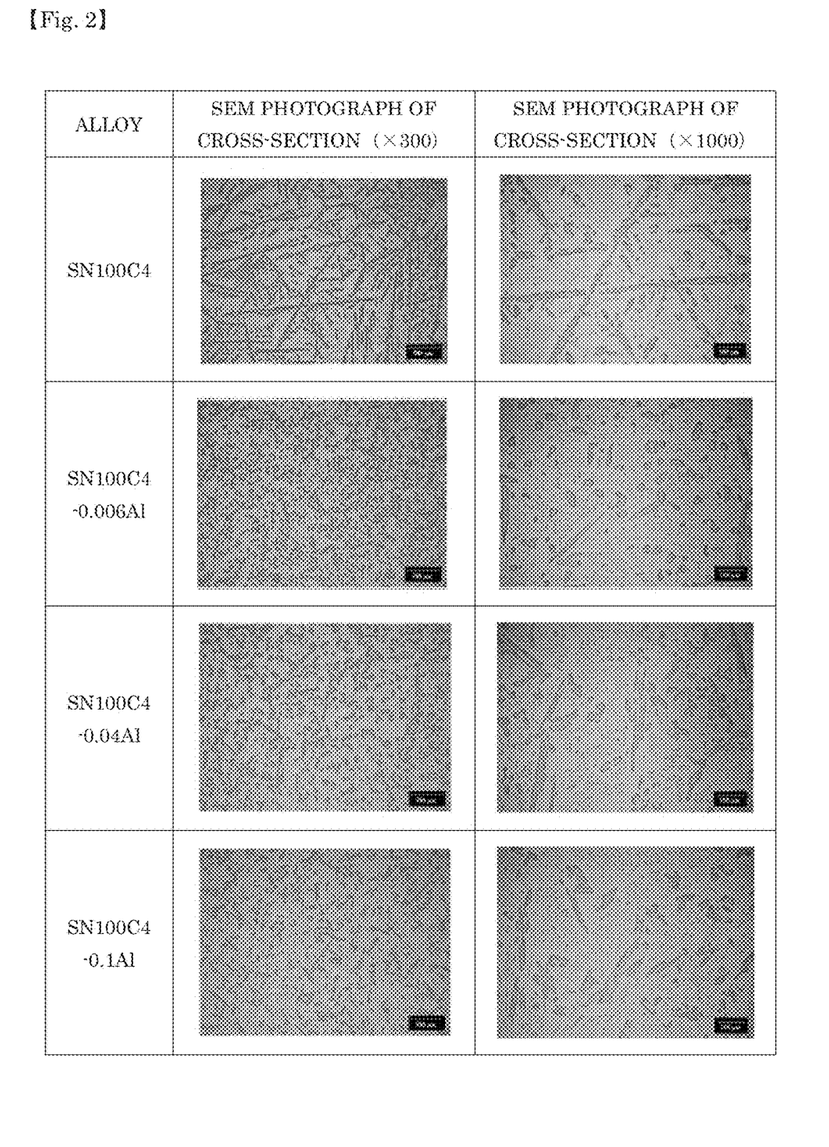
FIG. 2 illustrates the SEM photographs of the cross-section of the Sn—Cu—Ni alloy with a trace amount of Al added thereto.

As illustrated in FIG. 1, FIG. 2 illustrates SEM photographs that compare a sample of a solder alloy Sn-4 wt % Cu-0.05 wt % Ni-0.007 wt % Ge with no Al addition and three samples of the same alloy but with Al addition. In these samples, Ge is added. As Ge itself does not react with Sn and Cu, the same results are thus expected on a sample without Ge. Each photograph of FIG. 2 clearly illustrates that it is found that the primary crystal $Cu_6Sn_5$ intermetallic compound stops to grow in a phase of numerous particles and does not grow in the direction of length in the samples with Al addition at 60 ppm, 400 ppm, and 1000 ppm in contrast with the sample of no Al addition. More specifically, the addition of Al controls the large growth of the $Cu_6Sn_5$ intermetallic compound in the direction of length in the solder alloy containing Ni as illustrated in FIG. 2, and Sn—Cu—Ni phase continuously appears.

Figure 3:
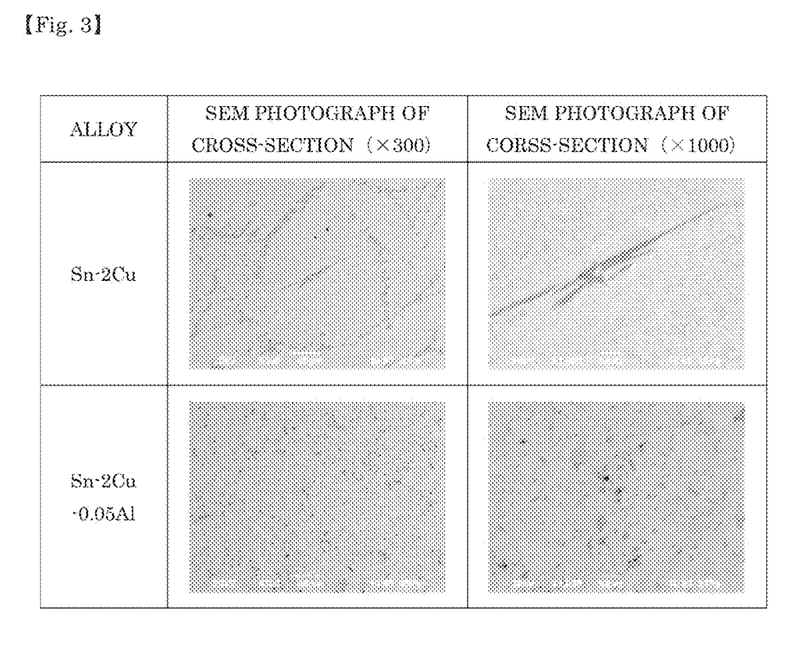
FIG. 3 illustrates the SEM photographs of the cross-section of the Sn-2.0 wt % Cu alloy with a trace amount of Al added thereto.

FIG. 3 illustrates the effect of the addition of Al to the $Cu_6Sn_5$ intermetallic compound when 2.0 weight percent of Cu is added to Sn. The same test conditions as in FIG. 1 and FIG. 2 were applied. As a result, the $Cu_6Sn_5$ intermetallic compounds grow long at a slant angle in the sample with no Al addition while the $Cu_6Sn_5$ intermetallic compounds are shaped in numerous particles with 0.05 weight percent of Al addition. This result verified that the addition of an appropriate amount of Al causes the desirable effect on the state of the $Cu_6Sn_5$ intermetallic compound even under the presence of 2.0 weight percent of Cu.

Figure 4:
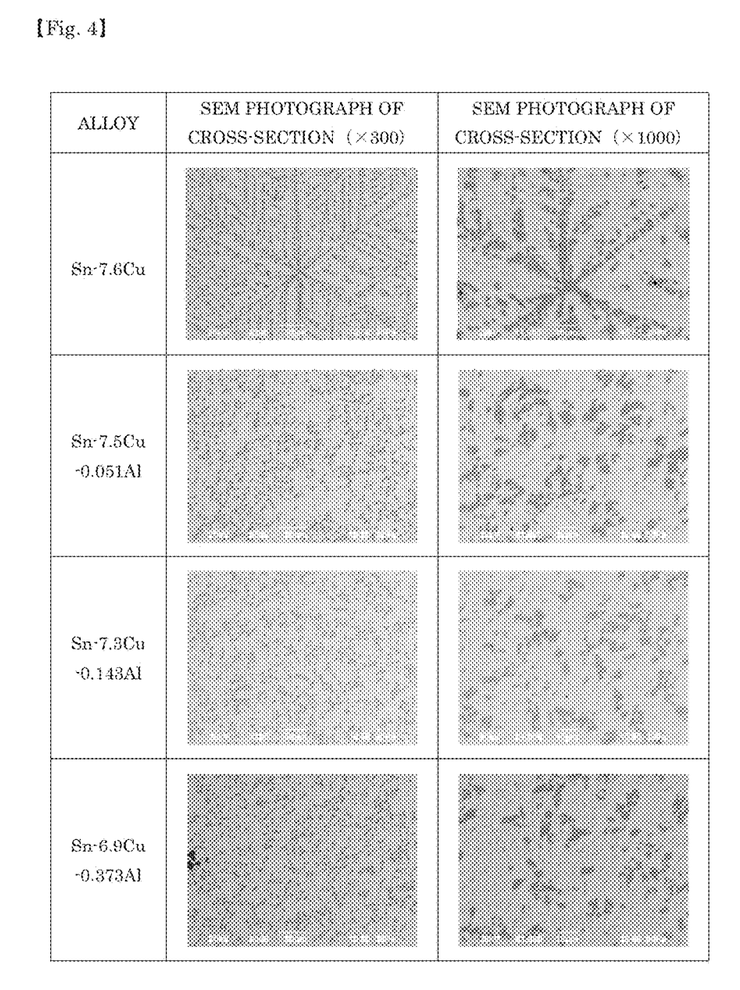
FIG. 4 illustrates the SEM photographs of the cross-section of the Sn-6.9 to 7.6 wt % Cu alloy with a trace amount of Al added thereto.

FIG. 4 illustrates, for comparison, a benchmark state in which the $Cu_6Sn_5$ intermetallic compound is generated in an alloy of Sn with 7.6 weight percent of Cu added thereto and a state in which the $Cu_6Sn_5$ intermetallic compound has grown with Al addition. In FIG. 4, the additive amounts of Cu are not calculated values but actual measurement values. As clearly illustrated, the $Cu_6Sn_5$ intermetallic compounds are shaped in numerous particles in an alloy of Sn-7.5 weight percent Cu with 0.051 weight percent of Al addition, an alloy of Sn-7.3 wt % Cu with 0.143 weight percent of Al addition, and an alloy of Sn-6.9 wt % Cu with 0.373 weight percent of Al addition. Dross was observed in the middle position at the left edge of the photograph in the sample of 0.373 weight percent of Al addition. The results verified that the addition of an appropriate amount of Al caused a desirable effect on the state of the $Cu_6Sn_5$ intermetallic compound even under the presence of 6.9 to 7.6 weight percent of Cu.

In view of the tests, the additive amount of Cu is 0.7 to 7.6 weight percent, more preferably, 2.0 to 7.6 weight percent. The present invention has been developed in view of the fact that hypereutectic Sn—Cu causes a $Cu_6Sn_5$ intermetallic compound to grow in the solder joint and a crack develops at the intermetallic compound serving as a border. The lower limit value of Cu is the lowest limit where Cu becomes hypereutectic with Sn and the primary crystal $Cu_6Sn_5$ intermetallic compound is generated. It is not important that the additive amount of Cu exceeds 0.7 weight percent as an exact value but it is important that the additive amount of Cu exceeds a value that causes hypereutectic Sn—Cu in the alloy. In other words, a hypereutectic range is important. The lower limit value of Cu is more preferably 2.0 weight percent. If 2.0 weight percent or higher of Cu is contained, the generation of the $Cu_6Sn_5$ intermetallic compound is pronounced. The addition of Al appropriately controls the generation of the $Cu_6Sn_5$ intermetallic compound, and thus serves the purpose of the present invention. If the upper limit exceeds 7.6 weight percent of Cu, the intermetallic compound generates $Cu_3Sn$ having the melting point of 415 degrees C. The upper limit is thus determined to avoid this. Test results indicate that if the lower limit value of Al or $Al_2O_3$ exceeds 0.006 weight percent, the growth of the primary crystal $Cu_6Sn_5$ intermetallic compound in the direction of length is controlled. The lower limit value of Al or $Al_2O_3$ is determined in view of the test results. If the upper limit value exceeds 0.15 weight percent of Al, a large amount of an oxide film is created with Al addition, and the surface of the alloy is blackened. A step to avoid such a phenomenon is needed. Manufacturing efficiency is lowered. A large amount of dross containing Al is created, and floats on the surface of the molten solder, leading to a reduction in the manufacturing efficiency.

Al in the present invention is not intended to cause Al to react with another element. The main purpose of Al addition is to control the growth of the primary crystal $Cu_6Sn_5$ intermetallic compound and to grow the primary crystal $Cu_6Sn_5$ intermetallic compound in particles with Al serving as nucleus. The composition serving as a nucleus may be an oxidized Al, namely, $Al_2O_3$. Since the present invention controls the growth of the tree-like structure of the primary crystal $Cu_6Sn_5$ intermetallic compound by adding Al. Alloys that also achieve the object of the present invention includes not only the two-element alloy containing Sn—Cu as main metals but also a three-element alloy resulting from adding Ni to the two-element alloy, a three-element alloy resulting from adding Ag to the two-element alloy, and an alloy resulting from adding another metal to Sn—Cu.

Advantageous Effects of Invention

As described with reference to the invention, the alloy containing Sn—Cu as principal elements is produced. Another alloy is produced by adding to the alloy, Ni or Ag, and a trace amount of Al. These alloys control the growth of a primary crystal $Cu_6Sn_5$ intermetallic compound in the direction of length, but create the primary crystal $Cu_6Sn_5$ intermetallic compound in particles with Al serving a nucleus of each particles. Since the Sn—Cu phase appears in a continuous state in a solidified alloy, a resulting solder alloy suffers less from cracks in response to an impact shock and is excellent in tension characteristics.

DESCRIPTION OF EMBODIMENTS

EXAMPLES

The inventors conducted tension tests on samples with no Al addition thereto. The purpose of the tension tests is to verify the hypothesis that a sample with Al addition thereto is stronger in tensile strength than a sample with no Al addition thereto. The hypothesis is based on the fact that since the primary crystal $Cu_6Sn_5$ intermetallic compound grows in an elongated fashion in the sample with no Al addition thereto as illustrated in FIG. 1 or FIG. 2, the structure of the sample becomes uneven and that the sample with no Al addition thereto is easily broken under the tension test while the sample with Al addition remains in a uniform state. To produce test specimens, an added metal was weighed in a graphite crucible manufactured by Nippon Crucible Co., Ltd. so that the total weight of the alloy was 600 g, and the graphite crucible with the sample therein was heated to 450 degrees C. in an electric furnace manufactured by Shinyo Scientific Instrument Co., Ltd. under the atmosphere to uniformly melt the test specimen. The test specimen was then flown into a stainless-steel casting mold under the room temperature, and left under the room temperature for 15 minutes. The test specimen was pulled out and used as a measurement test specimen. The measurement test specimen weighed about 170 g, and dimensions thereof were an entire length of 170 mm, a width of 10 mm, and a thickness of 10 mm. The tension tests were conducted on four test specimens including a comparative example with no Al addition, and examples 1 through 3. The tension tests were conducted on the specimens mounted on analytical and measuring instrument AG-10 kIS manufactured by SHIMADZU CORPORATION under the condition of tension speed of 10 mm/minute.

TABLE 1

| Components | Example 1 | Example 2 | Example 3 | Comparison Example 1 |
|---|---|---|---|---|
| Tin | 95.937 | 95.903 | 95.843 | 95.943 |
| Copper | 4.000 | 4.000 | 4.000 | 4.000 |
| Nickel | 0.050 | 0.050 | 0.050 | 0.050 |
| Germanium | 0.007 | 0.007 | 0.007 | 0.007 |
| Aluminum | 0.006 | 0.040 | 0.100 | — |
| Total | 100.000 | 100.000 | 100.000 | 100.000 |

Figure 5:
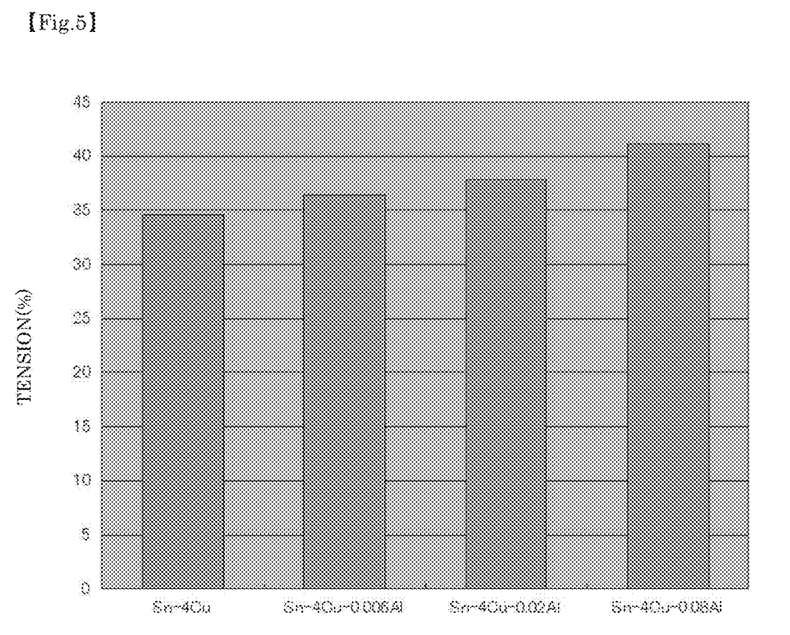
FIG. 5 is a graph illustrating a tension test of a specimen that is an Sn—Cu alloy with a trace amount Al added thereto.

FIG. 5 is a graph illustrating results of the tension tests. The leftmost column illustrates the example with no Al addition. The right three columns illustrate the examples with Al addition thereto. The results definitely show that all the examples with Al addition thereto are excellent in tension resistance than the example with no Al addition. In other words, all the examples with Al addition thereto are more excellent in fracture resistance than the example with no Al addition.

INDUSTRIAL APPLICABILITY

The solder alloy of the present invention controls the growth of the primary crystal $Cu_6Sn_5$ intermetallic compound in the hypereutectic composition in the direction of length, and thus reduces cracks in response to an impact shock even when the solder joint is miniaturized in step with today's downsizing trend.

The invention claimed is:

1. A solder alloy for producing ball grid array (BGA), the solder alloy consisting of:
   a Sn—Cu hypereutectic area having up to 7.6 weight percent of Cu;
   from 0.006 to 0.040 weight percent of Al, and
   from 0.03 to 0.1 weight percent of Ni.

2. The solder alloy for producing BGA according to claim 1, wherein the weight percent of Cu is at least 2.0.

3. The solder alloy for producing BGA according to claim 1, wherein a solder joint formed from the solder alloy contains fewer cracks in comparison to a second solder joint formed from a similar solder alloy without aluminum.

4. A solder alloy for producing BGA, the solder alloy consisting of:
   from 0.7 to 7.6 weight percent of Cu;
   from 0.006 to 0.040 weight percent of Al;
   from 0.03 to 0.1 weight percent of Ni; and
   a remainder of Sn.

5. The solder alloy for producing BGA according to claim 4, wherein the weight percent of Cu is at least 2.0.

6. The solder alloy for producing BGA according to claim 4, wherein a solder joint formed from the solder alloy contains fewer cracks in comparison to a second solder joint formed from a similar solder alloy without aluminum.

7. A solder alloy for producing BGA, the solder alloy consisting of:
   from 0.7 to 7.6 weight percent of Cu;

from 0.006 to 0.040 weight percent of Al;
from 0.03 to 0.1 weight percent of Ni; and
a remainder of Sn;
wherein the Al serves as a nucleus of a $Cu_6Sn_5$ intermetallic compound.

* * * * *